United States Patent [19]

Nagasaka

[11] Patent Number: 4,950,060
[45] Date of Patent: Aug. 21, 1990

[54] LENS DRIVING CAM MECHANISM

[75] Inventor: Ken Nagasaka, Osaka, Japan

[73] Assignee: Minolta Camera Kabushiki Kaisha, Osaka, Japan

[21] Appl. No.: 348,253

[22] Filed: May 5, 1989

[30] Foreign Application Priority Data

May 7, 1988 [JP] Japan .................................. 63-110672
May 7, 1988 [JP] Japan ................................ 63-60473[U]

[51] Int. Cl.$^5$ .......................... G02B 15/00; G02B 7/04
[52] U.S. Cl. ...................................... 350/429; 350/255
[58] Field of Search .................... 350/429, 255, 430; 354/400, 195.1

[56] References Cited

U.S. PATENT DOCUMENTS

| 4,576,446 | 3/1986 | Kamata | 350/429 |
| 4,636,042 | 1/1987 | Komine et al. | 350/429 |
| 4,834,514 | 5/1989 | Atsuta et al. | 350/429 |

FOREIGN PATENT DOCUMENTS

| 52-4924 | 4/1977 | Japan . |
| 60-41533 | 12/1985 | Japan . |
| 61-34116 | 3/1986 | Japan . |
| 61-20842 | 5/1986 | Japan . |
| 61-20843 | 5/1986 | Japan . |

Primary Examiner—Bruce Y. Arnold
Assistant Examiner—Loha Ben
Attorney, Agent, or Firm—Price, Gess & Ubell

[57] ABSTRACT

A lens-driving cam mechanism includes a zoom cylinder rotatable about the optical axis of the lens and a zoom cam ring incapable of rotation about the optical axis provided on the peripheral surface of the zoom cylinder. A front cam portion and a rear cam portion are formed on the zoom cylinder. Cam followers which contact with the front cam portion and the rear cam portion are formed on the peripheral surface of the zoom cylinder. When the zoom cylinder rotates, the zoom cam ring is moved along the optical axis by the cooperation of the cam portions and the cam followers. The zoom cam ring has on the inner surface thereof a cam follower-inserting groove for permitting one of the cam followers to pass therethrough so that the zoom cylinder and the zoom cam ring can be assembled.

9 Claims, 6 Drawing Sheets

LENS DRIVING CAM MECHANISM

BACKGROUND OF THE INVENTION

1. Field of the Invention

The present invention relates to a cam mechanism for use in a camera for driving lens held by a movable lens-frame, and more particularly, to a cam mechanism in which cam members can be formed with a plastic material.

2. Description of the Related Art

As well known, in a conventional cam mechanism for driving movable lens in a zoom lens system, the rotation or the linear movement of a zoom control ring is transmitted to a movable lens-frame supporting the movable lens through the engagement of a pin and a cam slot or through a cam and a cam follower which has been brought in contact with the surface of the cam so that the movable lens-frame is moved along the optical axis.

Heretofore, the manufacturing cost of the lens-barrel of the zoom lens system was expensive because many manufacturing processes are required to finish the cam members with a high accuracy. In order to overcome the above-described disadvantage, various cam members which can be manufactured by a simple molding method have been proposed.

The cam member disclosed in Japanese Utility Model Publication No. 52-4924 is advantageous because it is manufactured by a single process by using a plastic material and a sintered alloy.

However, according to this prior art, a pin mounted on a lens-frame which moves along a linear slot parallel to the optical axis formed on a stationary cylinder fixed to a camera body is brought in contact with the cam face formed on the notch of the rotatable cam ring and the lens-frame moves along the optical axis according to the rotation of the cam ring. However, since the cam face is formed on the face of the notch defined by cutting off part of the cam ring, the strength of the cam ring is not favorable so that deformation thereof may result during the time when it is molded.

In addition, no description is made in the prior art with regard to the method for mounting the cam ring on the stationary cylinder.

It is difficult to assemble a conventional cam mechanism comprising a stationary cam ring fixed to a camera body on which a linear cam slot parallel to the optical axis is formed, a movable cam ring movable about the stationary cam ring, on which a movable cam slot not parallel to the optical axis is formed, and a cam pin which passes through the intersection point of the movable cam slot and the linear cam slot is mounted on a lens-frame, because it is necessary to insert the pin through the intersection point of the movable cam slot and the linear cam slot while positioning them.

SUMMARY OF THE INVENTION

Accordingly, an essential object of the present invention is to provide a lens-driving cam mechanism in which cam members can be integrally molded with a plastic material and which is strong and reliably used.

It is another object of the present invention to provide a cam mechanism which has a simple construction and can be easily assembled so that the number of manufacturing processes is reduced.

In accomplishing this and other objects, according to one preferred embodiment of the present invention, there is provided an improved lens-driving cam mechanism which comprises a rotary cylinder unmovable along an axial direction; and a cam ring unrotatably mounted on the peripheral surface of the rotary cylinder on which the cam ring is moved in the axial direction by the rotation of the rotary cylinder. The lens-driving cam mechanism further comprises a pair of cam followers formed projectingly from the peripheral surface of the rotary cylinder, spaced from each other in the axial direction, and uncoincident with each other in the circumferential direction thereof; and front and rear cam portions which are formed integrally with the cam ring, have cam faces formed thereon, sandwiched between the pair of the cam followers, and brought in contact with the cam followers uncoincident with each other in any of the axial and circumferential directions thereof.

The lens-driving cam mechanism further comprises a cam follower-inserting groove, through which one of the cam followers is inserted, formed along the optical axis in a position in which the cam follower-inserting groove is uncoincident with the cam portions so that the cam ring can be assembled with the rotary cylinder through the cam follower-inserting groove.

According to the above-described construction, the cam ring can be prevented from being displaced from the rotary cylinder in the axial direction by the pair of the cam followers and when the rotary cylinder is rotated, the cam ring is moved in the axial direction by the cooperation of the pair of the cam followers and the cam faces. That is, the molding of the cam faces in predetermined configurations provides a cam mechanism which allows the predetermined movement of the cam ring along the axial direction. In addition, the cam mechanism eliminates the need for the provisions of a concave slot or a through slot in the circumferential direction thereof and the cam faces are sandwiched between the pair of the cam followers in the axial direction. Therefore, the cam ring can be molded without using a split mold.

In applying the cam mechansim to the barrel of a zoom lens, the rotary cylinder is rotated together with the zoom control ring and the cam ring is connected with the movable lens-frame supporting the movable lens group. Thereafter, the zoom control ring is rotated. According to this construction, the movable lens group can be moved along the optical azis.

The cam follower-inserting groove through which the cam follower is capable of being inserted is formed on the cam ring along the optical axis and in a position in which the cam follower-inserting groove does not correspond with the cam portions. Owing to this construction, the cam ring is fitted over the rotary cylinder with one of the cam follower passing through the cam follower-inserting groove, then either the rotary cylinder or the cam ring is rotated in a predetermined direction at a predetermined position. Thus, the pair of the cam followers and the cam faces corresponding thereto contact with each other, whereby the cam ring can be prevented from being displaced from the rotary cylinder along the optical axis.

Since the configurations of the members constituting the cam mechanism are relatively simple, the members can be integrally formed using a plastic material. Accordingly, the members can be manufactured in a greatly reduced number of processes. As described above, the cam portions for driving lenses can be formed by a combination of a movable mold and a stationary mold without using split molds such as slide cores used in a conventional manufacturing method of a cam slot. Therefore, the cam portions may be formed accurately with a predetermined distance spaced circumferentially and the outer surface of the cam portion may be kept continuous, which enables the manufacturing of cam members having a high accuracy in such aspects as circularity and cylindricity. Furthermore, since the cam ring can be made wide along the optical axis, it is possible to provide the cylindrical portion with many functions. For example, a mechanism for moving the lens forwardly or rearwards such as a helicoid screw may be mounted on the peripheral surface of the zoom cam ring, which leads to the manufacturing of a compact lens-barrel, the reduction of the manufacturing cost due to the use of the reduced number of parts, and the reduction of a period of time required to assemble the lens-barrel.

Furthermore, the rotary cylinder is mounted on the peripheral surface of the stationary cylinder and the cam ring can be assembled with the rotarty cylinder on the peripheral face thereof by inserting the rotary cylinder into the cam ring with one of the cam followers passing through the cam follower-inserting groove. Accordingly, the cam mechanism can be easily assembled.

BRIEF DESCRIPTION OF THE DRAWINGS

These and other objects and features of the present invention will become apparent from the following description taken in conjunction with the preferred embodiments thereof with reference to the accompanying drawings, in which:

FIG. 1 is a sectional view of the lens-barrel of a camera;

FIG. 2 is a front view of a zoom cam ring;

FIG. 3 is a sectional view taken along the line III—III shown in FIG. 2;

FIG. 4 is an exploded view of the zoom cam ring;

FIG. 5 is a front view of a zoom cylinder;

FIG. 6 is a sectional view taken along the line VI—VI shown in FIG. 5;

FIG. 7 is an exploded view of the zoom cylinder;

FIG. 8 is an exploded view showing conditions in which the zoom cam ring and the zoom cylinder combined with each other are operated;

FIG. 9 shows the procedure for combining the zoom cylinder and the zoom cam ring with each other;

DETAILED DESCRIPTION OF THE INVENTION

Figure 1:
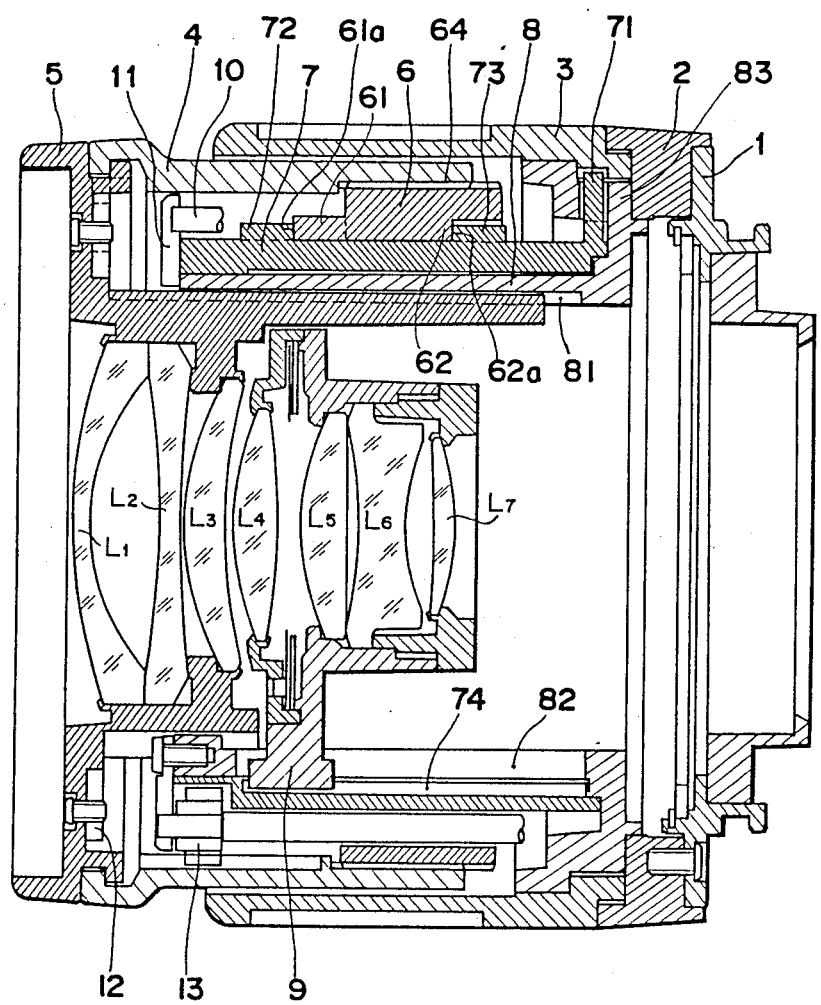
FIGS. 1 through 9 show a first embodiment in accordance with the present invention.

Before the description of the present invention proceeds, it is to be noted that like parts are designated by like reference numerals throughout the accompanying drawings.

Referring now to the drawings and in particular to FIG. 1, there is shown a zoom lens-barrel having a lens-driving driving cam mechanism in accordance with a first embodiment of the present invention. The lens-driving cam mechanism essentially comprises a zoom cylinder 7 rotatable about the optical axis of the lens, a pair of cam followers 72 and 73 projectingly integrated with the peripheral surface of the zoom cylinder 7, a zoom cam ring 6 incapable of rotation about the optical axis fitted over the peripheral face of the zoom cylinder 7, a front cam portion 61 and a rear cam portion 62 integrated with the zoom cam ring 6, and a cam follower-inserting groove 65 formed on the zoom cam ring 6.

The zoom lens-barrel comprises, in addition to the lens-driving cam mechanism, a lens mount which is mounted on a camera body and with which a holding ring 2 is coupled, a stationary cylinder 8 whose rear portion (camera body side) is fitted into the holding ring 2 and fixed with respect to the camera body, a zoom control ring 3 mounted on the peripheral surface of the stationary cylinder 8 for controlling a zooming operation by means of its rotation. In more detail, the rear portion of the zoom control ring 3 is fitted into a portion disposed between the holding ring 2 and the rear portion of the stationary cylinder 8. It is to be noted that the zoom control ring 3 is incapable of moving along the axial direction of the lens-barrel and rotatable about the optical axis.

Figure 5:
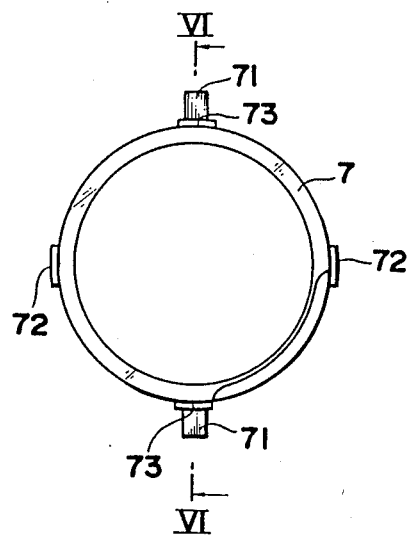

The zoom cylinder 7 is rotatably mounted between the stationary cylinder 8 and the zoom control ring 3 and has a rotation transmitting portion 71 fitted into a notch of the zoom control ring 3. Therefore, the zoom control ring 3 rotates about the optical axis together with the zoom cylinder 7 through the rotation transmitting portion 71. The pair of the cam followers 72 and 73 integrated with the zoom cylinder 7 projects radially outwards from the peripheral surface thereof, spaced from each other along the optical axis, and is uncoincident with each other in the circumferential direction thereof as shown best in FIG. 5 and FIG. 7. As shown in FIG. 5, two pairs of the cam followers 72 and 73 are formed on the zoom cylinder 7 in this embodiment. The cam followers 72 and 73 may be replaced with rollers mounted on the zoom cylinder 7 by means of screws. The zoom cylinder 77 is incapable of moving along the optical axis by the provisions of a flange 83 mounted on the rear portion of the stationary cylinder 8 and a guide plate 11 integrated with the stationary cylinder 8 at the front end thereof.

Figure 2:
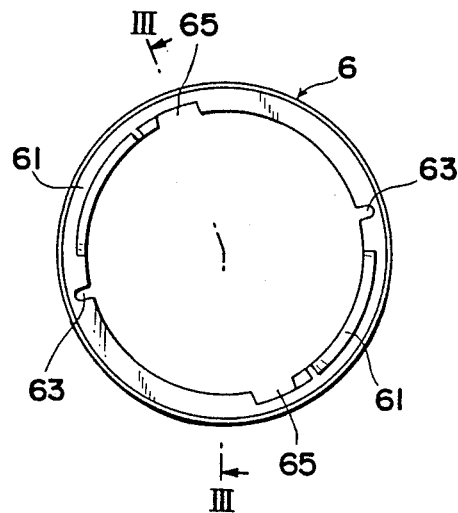
Figure 4:
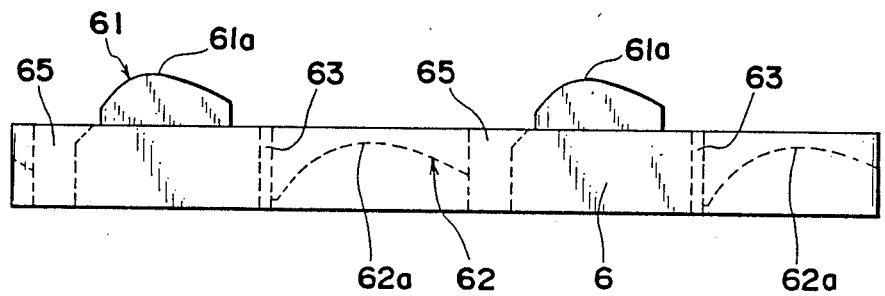

Referring to FIG. 1, the zoom cam ring 6 is provided on the peripheral surface of the zoom cylinder 7. As shown in FIGS. 1 and 2, a zoom cam ring-guide bar 10 integrated with the stationary cylinder 8 and the guide plate 11 extends through a slot 63 formed on the zoom cam ring 6. Accordingly, the zoom cam ring-guide bar 10 prevents the zoom cam ring 6 from rotating about the optical axis. As shown in FIG. 4, the front cam portion 61 and the rear cam portion 62 project alternately from the zoom cam ring 6. The cam face 61a of the cam portion 61 and the cam face 62a of the cam portion 62 contact with the cam followers 72 and 73, respectively. The cam faces 61a and 62a are uncoincident with each other in any of the optical axial and circumferential directions of the lens-barrel thereof. That is, during rotation of the zoom cylinder 77, the cam follower 72 integrated with and projecting from the zoom cylinder 7 is in contact with the cam surface 61a of the front cam portion 61, and the cam follower 73 integrated with and projecting from the zoom cylinder 7 is in contact with the cam surface 62a of the rear cam portion 62. Thus, the zoom cam ring 6 relatively moves between the cam followers 72 and 73 in contact therewith, i.e., the direction of the force applied by the combination of the cam follower 72 and the cam face 61a and the direction of the force applied by the combination of the cam follower 73 and the cam face 62a are opposite to each other. With this construction, while the zoom cylinder 7 is rotating, the zoom cam ring 6 is prevented from being displaced out of position and the zoom cam ring 6 is guided along the optical axis by the zoom cam ring-guide bar 10.

A helocoid screw 64 for moving a first lens group unit $L_1$ through $L_3$ forward or rearward is mounted on the peripheral surface of the zoom cam ring 6, and a focus control ring 4 which is coupled with the screw 64 for controlling a focus operation by means of it rotation is provided inside the zoom control ring 3. A first lens group supporting frame 5 which is incapable of independently moving along the optical axis and being rotatable about the optical axis with respect to the focus control ring 4, is fitted in the front end portion of the focus control ring 4. The first lens group supporting frame 5 is partly fitted in the inner surface of the stationary cylinder 8, holds the first lens group $L_1$ through $L_3$, and is rectilinearly guided by a slot 81 formed on the inner surface of the stationary cylinder 8 which is parallel with the optical axis. Accordingly, the first lens group supporting frame 5 is moved forward or rearward in a rectilinear manner according to the rotation of the focus control ring 4. That is, when the focus control ring 4 is manually rotated, the first lens group $L_1$ through $L_3$ is rectilinearly moved in an amount corresponding to the forward or rearward movement of the first lens group supporting frame 5. The rotation amount of the focus control ring 4 is controlled by bringing part of the focus control ring 4 in contact with a focus stopper plate 12 integrated with the first lens group supporting frame 5.

Figure 6:
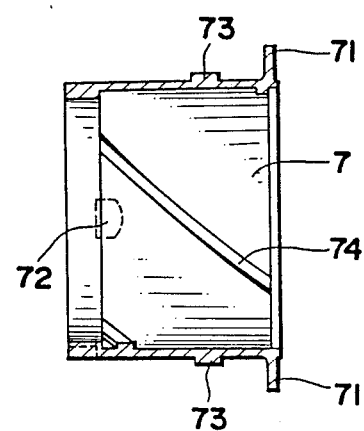

As shown in FIGS. 1 and 6, a second lens group or unit guiding cam groove 74 is formed on the inner circumferential face of the zoom cylinder 7. Part of the second lens group supporting frame 9 supporting a second lens group $L_4$ through $L_7$ is fitted in the cam groove 74 and also in a second lens group guiding slot 82 which is formed in the stationary cylinder 8 in parallel with the optical axis.

Figure 3:
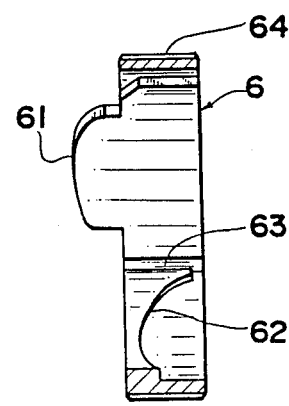

The detailed description of the zoom cam ring 6 is made referring to FIGS. 2, 3, and 4 hereinbelow. As shown in FIG. 4, the front cam portion 61 and the rear cam portion 62 projecting inwardly from the inner circumferential face of the zoom cam ring 6 are uncoincident with each other in the circumferential direction of the zoom cam ring 6. The front cam portion 61 and the rear cam portion 62 control the movement of the first lens group $L_1$ through $L_3$ in the zooming operation. The front cam portion 61 projects in the axial direction of the zoom cam ring 6 in accordance with this embodiment as apparent from FIG. 3, however, it may be formed on the inner circumferential face of the zoom cam ring 6 as will be described in a second embodiment of the present invention. A zoom can ring-guide slot 63 is formed on the inner circumferential face of the zoom cam ring 6 along the optical axis. The zoom cam ring-guide bar 10 for preventing the zoom cam ring 6 from rotating about the optical axis is fitted in the zoom cam ring-guide slot 63. The cam follower-inserting groove 65 through which the front cam follower 72 can be inserted without contacting with the front and rear cam portions 61 and 62 in an assembly process with the zoom cylinder 7 and the zoom cam ring 6 described latter is formed on the inner circumferential face of the zoom cam ring 6 along the optical axis.

Figure 7:
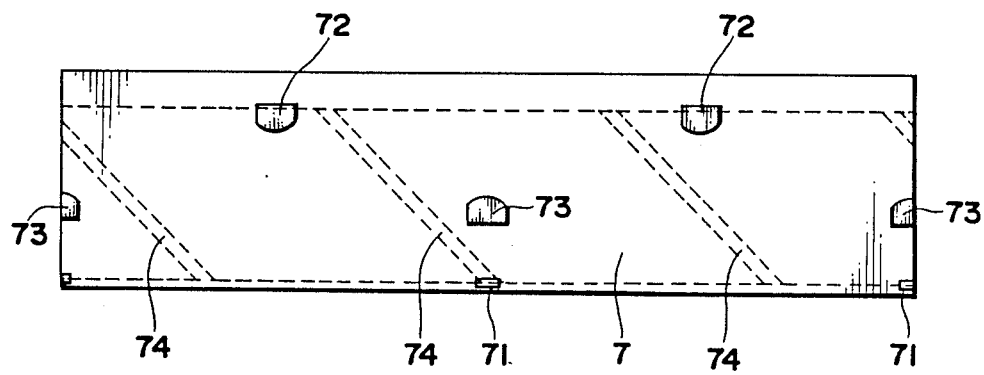

Referring to FIGS. 5, 6, and 7, the zoom cylinder 7 has the two pairs of cam followers 72 and 73, projecting radially outwardly and contacting with the cam faces 61a and 62a respectively of the cam portions 61 and 62 of the zoom cam ring 6, formed on the periheral surface thereof. The zoom cylinder 7 has the second lens group guiding cam groove 74, for moving the second lens group supporting frame 9 along the optical axis, formed on the inner circumferential face thereof. As shown in FIG. 7, the pair of the cam followers 72 and 73 are spaced from each other along the optical axis and uncoincidient with each other in the circumferential direction thereof. Further, as described above, the zoom cylinder 7 has the rotation transmitting portion 71 which transmits the rotation of the zoom control ring 3 to the zoom cylinder 7.

The operation of the lens-driving cam mechanism having the above-described construction is described hereinbelow. When the zoom control ring 3 is rotated, the zoom cylinder 77 is rotated about the optical axis without moving along the optical axis and the zoom cam ring 6 located between the pair of the cam followers 72 and 73 moves along the optical axis according to the configurations of the cam faces 61a and 62a. As a result, the first lens group supporting frame 5 supporting the first lens group $L_1$ through $L_3$ rectilinearly moves along the optical axis, and the second lens group supporting frame 9 supporting the second lens group $L_4$ through $L_7$ and fitted in the cam groove 74 and the second lens group guiding slot 82 also rectilinearly moves in the direction of the optical axis along the intersection point of the second lens group guiding slot 82 of the stationary cylinder 8 and the cam groove 74 of the zoom cylinder 7. In order to obtain an in-focus condition, the focus control ring 4 is rotated. As a result, the first lens group supporting frame 5 fitted in the front end portion of the focus control ring 4 moves rectilinearly along the optical axis together with the first lens group $L_1$ through $L_3$. The zoom lens system of the present invention also can be used in an automatic focusing operation by means of attaching an automatic focusing camera having a lens driving mechanism. In the automatic focusing operation, an automatic focusing gear 13 interlocked with the driving mechanism provided in the camera body is rotated. Since the automatic focusing gear 13 is operatively connected with part of the focus control ring 4, the focus control ring 4 is rotated. As a result, similarly to the manual operation, the first lens group $L_1$ through $L_3$ is rectilinearly moved, whereby an in-focus state is obtained.

Figure 8A:
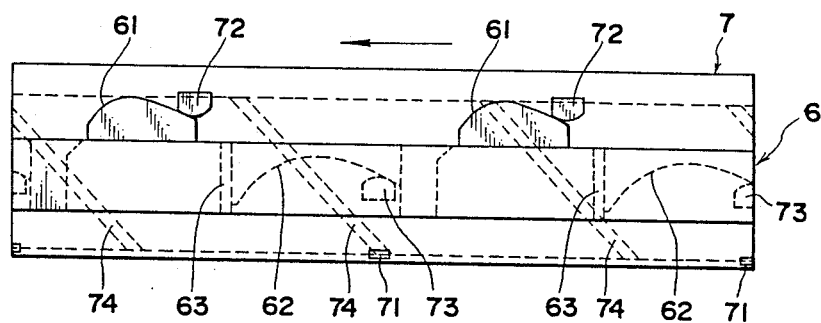
Figure 8B:
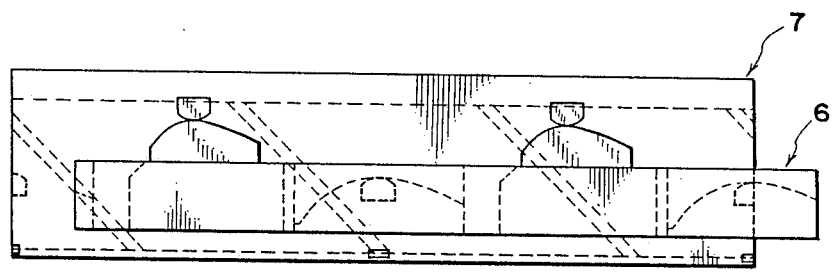
Figure 8C:
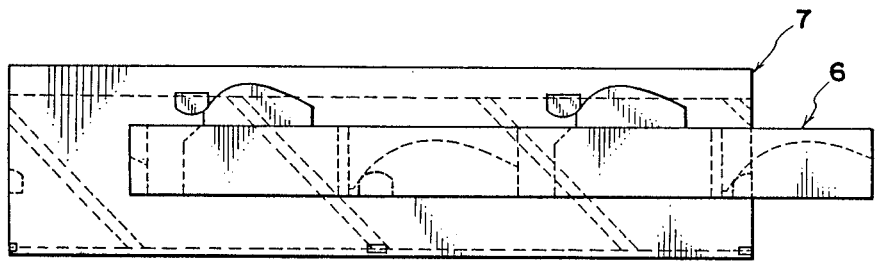

FIGS. 8 (A), (B) and (C) show, respectively, the state in which the zoom cam ring 6 moves along the optical axis due to the rotation of the zoom cylinder 7. That is, while the zoom cylinder 7 is rotating, the front cam portion 61 and the rear cam portion 62 of the zoom cam ring 6 are located between the front and rear cam followers 72 and 73 integrated with the zoom cylinder 7. During this period of time, the rotation of the zoom cam ring 6 is prevented by the zoom cam ring-guide slot 63. Therefore, with the rotation of the zoom cylinder 7 in the direction shown by an arrow in FIG. 8, the zoom cam ring 6 rectilinearly moves along the cam faces 61a and 62a.

Figure 9:
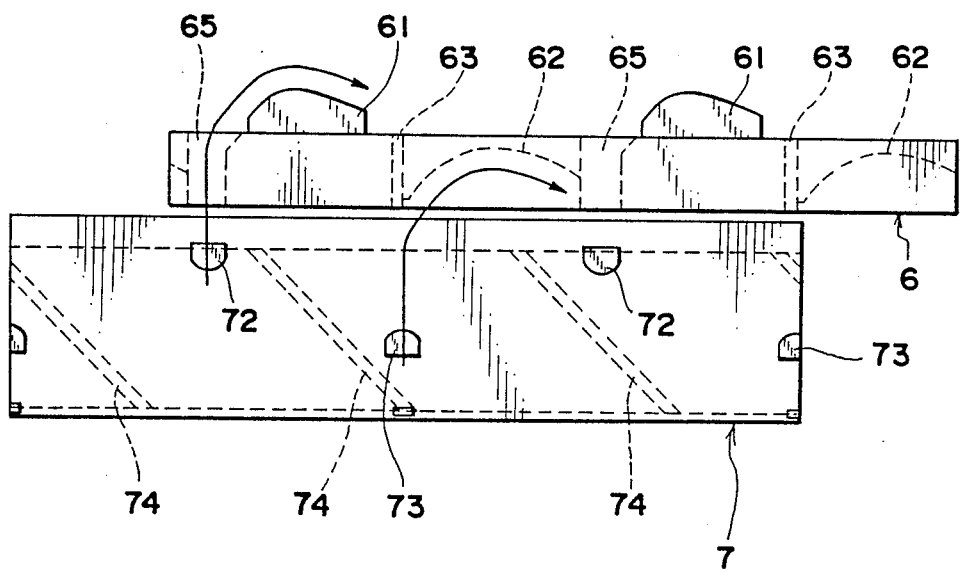

Referring to FIG. 9 showing the steps for combining the zoom cam ring 6 and the zoom cylinder 7 with each other in the first embodiment. First, the zoom cylinder 7 is inserted in the zoom cam ring 6 with the cam follower 73 passing through the cam follower-inserting groove 65 of the zoom cam ring 6. Thereafter, the zoom cam ring 6 or the zoom cylinder 7 is rotated so that the cam followers 72 and 73 are guided into the cam portions 61 and 62, respectively. Thus, the cam portions 61 and 62 are sandwiched between the pair of the cam followers 72 and 73, whereby the zoom cam ring 6 is prevented from being displaced from the zoom cylinder 7 along the optical axis. Since the zoom cylinder 7 is restricted to rotate more than a predetermined amount, the zoom cam ring 6 is prevented from being displaced from the cam followers 72 and 73 after the zoom cylinder 7 and the cam ring 6 are assembled with each other.

As apparent from the foregoing description, according to the first embodiment, it is possible to form the cam portions 61 and 62 of the lens-driving cam mechanism by using a mold consisting of only a fixed mold and a movable mold, instead of a plurality of split molds such as slide cores used in a conventional manufacturing method of a cam slot since the cam portions 61 and 62 can be formed so as to project inwardly from the inner circumferential face, so that the positioning of the cam portions 61 and 62 can be accurately performed and also the cam portions are preferable in circularity an cylindricity. Furthermore, since the cam ring 6 can be made wide along the optical axis, it is possible to provide the cylindrical portion with many functions. For example, a mechanism for moving the lens forwardly or rearwardly such as the helicoid screw 64 may be mounted on the peripheral surface of the zoom cam ring 6, which leads the manufacturing of a compact lens-barrel, the reduction of the manufacturing cost due to the use of the reduced number of parts, and the reduction of the period of time required to assemble the lens-barrel.

Figure 10:
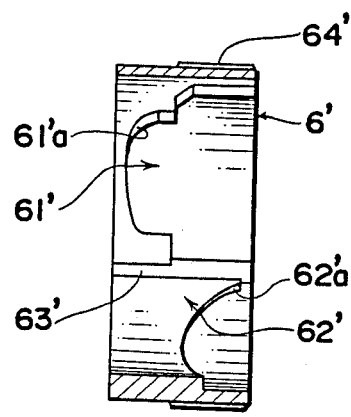
FIG. 10 is sectional view of a zoom cam ring in accordance with a second embodiment of the present invention.
Figure 11:
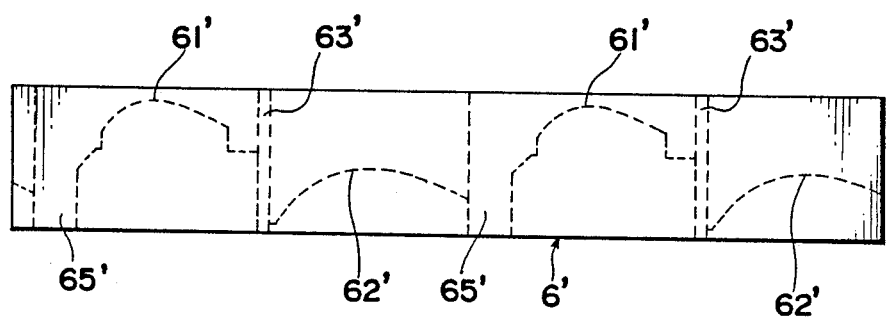
FIG. 11 is an exploded view of a zoom cam ring shown in FIG. 10.

A second embodiment in accordance with the present invention is described referring to FIGS. 10 and 11. Reference numeral 6' shows a modification of the zoom cam ring 6. The cam portion 61' having a cam face 61'a and the other cam portion 62' having a cam face 62'a respectively project inwardly from the inner peripheral surface of the zoom cam ring 6'. Needless to say, the configurations of the cam portion 61' and 62' are not limited to those shown in FIG. 10. In addition, the zoom cam ring 6' comprises a zoom cam ring-guide slot 63', a helicoid screw 64', and a cam follower-inserting groove 65'.

The zoom cam ring in accordance with the second embodiment is cylindrial throughout its circumference. Accordingly, the zoom cam ring 6 is favorable in circularity and cylindricity and as such, not susceptible to shock. Needless to say, the zoom cam ring 6 can also be integrally formed by using two molds defining a pair of molding faces.

Although the present invention has been fully described with reference to the accompanying drawings, it is to be noted that various changes and modifications are apparent to those skilled in the art. Such changes and modifications are to be understood as included within the scope of the present invention as defined by the appended claims unless they depart therefrom.

What is claim is:

1. A lens-driving cam mechanism adapted to a zoom lens system for driving at least a movable lens unit of the zoom lens system in a zooming operation comprising:
   a stationary cylinder adapted to be fixed to a camera body;
   a rotary cylinder held rotatably about said stationary cylinder and having at least one pair of cam followers on the circumference thereof; and
   a cam ring held rectilinearly movable only along an optical axis relative to said rotary cylinder and having at least one pair of cam faces which are brought in contact with said at least one pair of cam followers formed on said rotary cylinder,
   whereby said cam ring is moved rectilinearly by the rotation of said rotary cylinder along the optical axis according to the sliding contact of the pair of said cam followers and said cam faces.

2. A lens-driving cam mechanism adapted to a zoom lens system for driving at least a movable lens unit of the zoom lens system in a zooming operation comprising;
   a stationary cylinder adapted to be fixed to a camera body;
   a rotaty cylinder held rotatably about said stationary cylinder and having at least one pair of cam followers disposed in a forward and rearward position, respectively, on the circumference thereof in the direction of an optical axis of the lens unit and uncoincident with each other in the circumferential direction thereof; and
   a cam ring held rectilinearly movable only along the optical axis relative to said rotary cylinder and having at least one cam portion whose cam faces are disposed forwardly and rearwardly along the optical axis and uncoincident with each other in the circumferential direction thereof so that said cam faces are sandwiched between the pair of said cam followers formed on said rotary cylinder and are brought in contact therewith,
   whereby said cam ring is moved rectilinearly by the rotation of said rotary cylinder along optical axis according to the sliding contact of the pair of said cam followers and said cam faces.

3. A lens-driving cam mechanism as claimed in claim 2, wherein said cam ring is disposed on the outer peripheral side of said rotary cylinder, and the pair of said cam followers is formed on an outer peripheral surface of said rotary cylinder, and said cam portion having the pair of said cam faces is formed on an inner circumferential surface of said cam ring.

4. A lens-driving cam mechanism as claimed in claim 3, further comprising a zoom control ring held to be rotatable about said stationary cylinder and being rotatable together with said rotary cylinder in the zooming operation;
   a first lens unit supporting frame for supporting a first lens unit which is to be moved along the optical axis in the zooming operation, said first lens unit being also movable in the focusing operation; and
   a focus control ring, connecting said first lens unit supporting frame and said cam ring to each other, in the focusing operation,
   whereby during the zoomig operation for rectilinearly moving said cam ring along the optical axis due to the rotation of the zoom control ring, the rectilinear movement of said cam ring is unchangeably transmitted to said first lens unit supporting frame through said focus control ring so as to move said first lens unit.

5. A lens-driving cam mechanism as claimed in claim 4, wherein said focus control ring is disposed on the peripheral side of said cam ring and means for moving said first lens unit supporting frame is provided between said cam ring and said focus control ring.

6. A lens-driving cam mechanism as claimed in claim 5, further comprising:
a second lens unit;
a second supporting frame for supporting said second lens unit which is to be moved along the optical axis only in the zooming operation,
wherein a linear slot, parallel with the optical axis, is formed on said stationary cylinder, a second lens unit-guiding cam groove is formed on said rotary cylinder and said second lens unit-supporting frame is provided with means fitting in said linear slot and said second lens unit-guiding cam groove, and when said rotary cylinder is rotated in the zooming opertion due to the rotation of said zoom control ring, said second lens unit-supporting frame is guided along the optical axis by both said linear slot and said second lens unit-guiding cam groove.

7. A lens-driving cam mechanism as claimed in claim 2, wherein portions of said cam followers which are to be brought in contact with said cam faces are outwardly projectingly formed.

8. A lens-driving cam mechanism as claimed in claim 2, wherein said cam ring comprises a cam follower-inserting groove for permitting one of said cam followers to pass therethrough without being interfered by said cam faces so that said cam ring and said rotary cylinder may be assembled with each other with the pair of said cam followers sandwiching the pair of said cam faces.

9. A lens-driving cam mechanism as claimed in claim 8, wherein said cam follower-inserting groove is parallel with the optical axis.

* * * * *